United States Patent
Jones et al.

(10) Patent No.: US 6,304,523 B1
(45) Date of Patent: Oct. 16, 2001

(54) PLAYBACK DEVICE HAVING TEXT DISPLAY AND COMMUNICATION WITH REMOTE DATABASE OF TITLES

(75) Inventors: Scott A. Jones, Carmel; Douglas M. Keenan, Noblesville, both of IN (US)

(73) Assignee: Openglobe, Inc., Indianapolis, IN (US)

( * ) Notice: Subject to any disclaimer, the term of this patent is extended or adjusted under 35 U.S.C. 154(b) by 0 days.

(21) Appl. No.: 09/227,086

(22) Filed: Jan. 5, 1999

(51) Int. Cl.$^7$ .................................................. G11B 17/22
(52) U.S. Cl. ................................................ 369/30; 700/231
(58) Field of Search .................................. 369/30, 33, 34, 369/36, 37, 178; 364/410.1, 479.11; 340/825.35; 700/231

(56) References Cited

U.S. PATENT DOCUMENTS

| | | |
|---|---|---|
| 5,113,383 | 5/1992 | Amemiya et al. . |
| 5,132,949 | 7/1992 | Choi . |
| 5,157,614 | 10/1992 | Kashiwazaki et al. . |
| 5,157,646 | 10/1992 | Amemiya et al. . |
| 5,263,010 | 11/1993 | Amemiya et al. . |
| 5,341,350 * | 8/1994 | Frank et al. ............................ 369/30 |
| 5,392,264 | 2/1995 | Hira . |
| 5,446,714 | 8/1995 | Yoshino et al. . |
| 5,463,605 | 10/1995 | Nishida et al. . |
| 5,464,946 | 11/1995 | Lewis . |
| 5,475,835 | 12/1995 | Hickey . |
| 5,559,764 | 9/1996 | Chen et al. . |
| 5,615,345 | 3/1997 | Wanger . |
| 5,625,608 | 4/1997 | Grewe et al. . |
| 5,642,337 * | 6/1997 | Oskay et al. ........................... 369/30 |
| 5,679,911 | 10/1997 | Moriyama et al. . |
| 5,680,379 | 10/1997 | Ishida et al. . |
| 5,689,484 | 11/1997 | Hirasawa . |
| 5,691,964 * | 11/1997 | Niederlein et al. ..................... 369/30 |
| 5,701,385 | 12/1997 | Katsuyama et al. . |
| 5,726,957 | 3/1998 | Hisamatsu et al. . |
| 5,740,304 | 4/1998 | Katsuyama et al. . |
| 5,751,672 | 5/1998 | Yankowski . |
| 5,757,739 | 5/1998 | Heath et al. . |
| 5,768,222 | 6/1998 | Hisamatsu et al. . |
| 5,774,431 | 6/1998 | Bos et al. . |
| 5,781,889 * | 7/1998 | Martin et al. ............................ 705/1 |
| 5,793,726 | 8/1998 | Nagano . |
| 5,815,471 | 9/1998 | Mince et al. . |
| 5,822,283 | 10/1998 | Bos et al. . |
| 5,959,944 * | 9/1999 | Dockes et al. ......................... 369/30 |
| 5,959,945 * | 9/1999 | Kleiman ................................. 369/30 |
| 6,011,758 * | 1/2000 | Dockes et al. ......................... 369/30 |
| 6,031,795 | 2/2000 | Wehmeyer . |
| 6,034,925 | 3/2000 | Wehmeyer . |

FOREIGN PATENT DOCUMENTS 10-171818 * 6/1998 (JP) ....................................... 369/30

* cited by examiner

*Primary Examiner*—Tan Dinh
(74) *Attorney, Agent, or Firm*—Staas & Halsey LLP

(57) ABSTRACT

A low-cost library management solution for consumer music selection systems. A multiple CD changer includes non-volatile storage for textual title and track information about the CDs in the changer. Also included is a communication device that communicates with a remote database to obtain the textual information. Instead of using a modem or an ISDN terminal adapter, the communication device uses a DTMF generator/detector to communicate with a front-end processor of the remote database using DTMF signals, or uses a conventional serial or parallel interface to communicate with an external device connected to the Internet that transmits queries formulated by the changer to the remote database and provides the response to the changer.

7 Claims, 4 Drawing Sheets

FIG. 2

| GENERAL PURPOSE |
| --- |
| QUICK LOOKUP CODES |
| SYSTEM SESSION STATE VARIABLES |
| TEXTUAL INFORMATION TO DISPLAY FOR CURRENTLY PLAYING RECORDING |

FIG. 4

| SYSTEM CONFIGURATION |
| --- |
| DIRECTORY INFORMATION |
| DISC INFO. STRUCTURE #1 |
| DISC INFO. STRUCTURE #2 |
| DISC INFO. STRUCTURE #3 |
| ... |
| DISC INFO. STRUCTURE #N |

| MOVEMENT NO. | POINT | MOVEMENT ELAPSED TIME | | | ABSOLUTE TIME FOR POINT CONTENT | | |
|---|---|---|---|---|---|---|---|
| | | MIN. | SEC. | FRAME | P MIN. | P SEC. | P FRAME |
| | | | | 0 | | | |

| DISC ARTIST |
|---|
| DISC TITLE |
| DISC TRACK TITLE #1 |
| DISC TRACK TITLE #2 |
| . . . |
| DISC TRACK TITLE #N |
| DISC RELATED URL |
| SYSTEM LOCATION |

PLAYBACK DEVICE HAVING TEXT DISPLAY AND COMMUNICATION WITH REMOTE DATABASE OF TITLES

BACKGROUND OF THE INVENTION

1. Field of the Invention

The present invention is directed to an apparatus for reproducing at least audio signals and, more particularly, for an apparatus that displays the title of the recording being reproduced and obtains the titles by communicating with a remote database.

2. Description of the Related Art

Compact discs (CD) have been available to consumers for over ten years and individual collections of hundreds of CDs are not uncommon. As prices have declined, sales have increased for CD changers capable of storing and selectively playing one hundred or more CDs. However, a significant drawback has held back the success of this type of CD changer; with so many recordings out of sight in a single device, selecting a desired recording is not easily accomplished. Typical CD changers do not provide any convenient method for cataloging the CD collection or tracking internal rearrangement of the current collection.

The problem is not limited to music CDs. The CD format is used for other types of sound recordings, as well as graphics (CD-G), video (CD Video) and computer accessible data and programs (CD-ROM, CD-R, etc.). Other formats, such as MiniDiscs™ and digital video (or versatile) discs (DVDs) have received varied acceptance by consumers and playback devices for these formats would have similar problems.

Some of the tools to solve the problem are available. Some CD players are capable of storing textual information about the discs, but the interface used is so cumbersome that relatively few users enter all of the information that is available from other sources. Specifically, computer databases of CD title and track information have been available for over five years. For example, CDDB is a consumer supported database accessed via the Internet by over 150 programs to display CD title and track information of CDs played using the CD drive of a personal computer. These programs automatically contact CDDB to obtain title and track information about a CD when it is first played and store the information for subsequent times that the CD is played. Different vendors have sold systems, such as TuneBase™ and TuneBasic™ from Escient, for several years that provide a local database for conventional music or audio/video systems by interfacing with CD changers that store one hundred or more CDs. However, all of these solutions require the power (and cost) of a computer, preferably with a connection to the Internet to obtain up-to-date CD title and track information.

U.S. Pat. No. 5,751,672 to Yankowski discloses two embodiments of a system that includes a CD changer and a modem for communication with a remote database of CD title and track information. The first embodiment of the '672 patent utilizes a separate computer, like the systems described in the preceding paragraph. The second embodiment of the '672 patent incorporates at least an internal modem and communication software in a CD changer to obtain CD title and track information for a recording that is being played. A variation of the second embodiment of the '672 patent incorporates "mass storage" in the CD changer to maintain a local database of the CDs in the changer, like the databases stored in computers and other systems that access CDDB. However, even the simplest embodiment disclosed in the '672 patent still requires all the hardware and software to communicate with a remote database by a modem. An ISDN terminal adapter is the only alternative to a modem taught by the '672 patent.

SUMMARY OF THE INVENTION

It is an object of the present invention to provide a CD changer with enhanced capabilities at a reasonable cost.

It is another object of the present invention to provide a recording reproduction apparatus capable of displaying textual information about recordings, obtained from a remote database without requiring a modem.

The above objects can be attained by an apparatus for playback of recordings and communication with a remote database to obtain information about the recordings, including a recorded signal output device to reproduce a recorded signal from a recording; a display to display at least textual data; a memory to store a textual recording name of the recording for output to the display in response to output of the recorded signal by the recorded signal output device; a communication device to obtain the textual recording name by communication with the remote database without using a modem or a terminal adapter; and a controller, coupled to the recorded signal output device, the display, the memory and the communication device, to control the apparatus to establish communication with the remote database, query the remote database based on information in the recorded signal reproduced from the recording and supply the textual recording name of the recording from the remote database to the memory.

Preferably, the recorded signal output device, display, memory, communication device and controller are within a single enclosure. Also, the memory preferably stores information about several recordings that previously have been inserted into the apparatus. One of the methods for communication without using a modem is to generate and detect dual-tone multifrequency signals in the communication device to communicate with the remote database. Another method is to use an interface, coupled to the communication device, mounted in the enclosure, and using a standard set by one of the Electronic Industry Association and the Institute of Electrical and Electronics Engineers, such as RS-232 or IEEE 1394, for external communication with another device capable of communicating with the remote database.

When the remote database is connected to a public computer network, the apparatus may be connected to a local network coupled to the public computer network. In this case, the apparatus may include a network interface, coupled to the communication device and mounted in said enclosure, for external communication with the local network and at least one of the controller and the communication device may provide a TCP/IP stack for communication with the remote database via the network interface and the local and public computer networks.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an example of information stored in volatile memory.

FIG. 3 is an entry for a track in the table of contents in the lead-in area of a conventional compact disc.

FIG. 4 is an example of information stored in non-volatile memory.

FIG. 5 is a disc information structure record in non-volatile memory.

DESCRIPTION OF THE PREFERRED EMBODIMENTS

Figure 1:
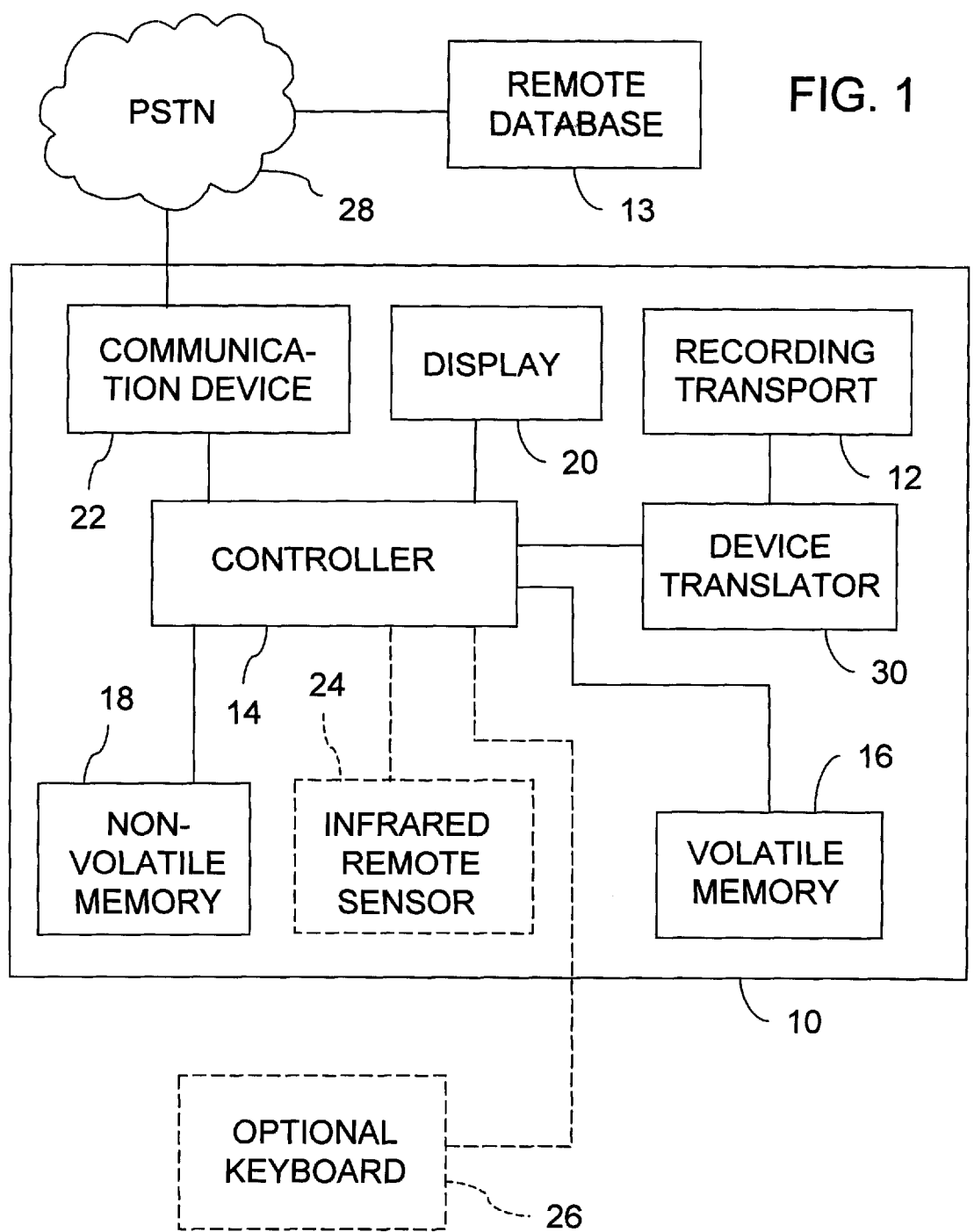
FIG. 1 is a block diagram of a system according to the present invention.

Illustrated in FIG. 1 is a block diagram of an apparatus according to the present invention. An enclosure 10 surrounds recording transport 12 and controller 14 of the apparatus. Controller 14 is coupled to recording transport 12 and both volatile memory 16 and non-volatile memory 18. Mounted at the surface of the enclosure 10 are display 20 and communication device 22, both of which are also coupled to controller 14. One or more user interface devices are also connected to controller 14, such as infrared remote sensor 24 or keyboard 26 which may be external to the apparatus as illustrated in FIG. 1, or a smaller keypad mounted at the surface of the apparatus.

Recording transport 12 may be any conventional recorded signal output device with the ability to at least mount and eject the recordings and supply the recorded signals stored on the recordings to controller 14. In most cases, enclosure 10 will be used to store multiple recordings and recording transport 12 will move the recordings between their storage locations and a playback area. The present invention may be used for compact discs, DVDs, MiniDiscs™, or even non-disc recording media, such as tapes or solid state memory. The present invention is not limited to music recordings, but may used with video and data recordings where additional information about the recordings is stored in a remote database 13. The recorded signals include anything stored on the recordings, including control information, such as table of contents (TOC) data. In the following description, the term compact disc or its abbreviation CD will be used interchangeably with "recording" since CDs are commonly used recordings today. Thus, recording transport 12 may be a CD changer mechanism.

Controller 14 may be any suitable control device, such as Microchip PIC16C67 or Motorola 6805 or the controller used in conventional changers. An advantage to using a programmable controller like the PIC16C67 is that it is possible to download a new program for controller 14 to change the operation of the apparatus, as described below. Furthermore, more than one device may be used to perform the functions of controller 14. For example, conventional CD changer operations may be performed by one device and the processing of disc IDs and database queries described below may be performed by a second device which is more likely to be programmable.

Volatile memory 16 may be used for storing information obtained from the recorded signal output by recording transport 12, such as information obtained from the table of contents or TOC on the recording. An example of what is stored in volatile memory 16 is illustrated in FIG. 2. The TOC of CDs, for example, as described in chapter 5 of Compact Disc Technology, by Heitaro Nakajima and Hiroshi Ogawa published in 1992 by Ohmsha, Ltd., 3-1 Kanda Nishiki-cho, Chiyoda-ku, Tokyo 101, Japan, has entries for each track in the format illustrated in FIG. 3 repeated as many times as possible in the lead-in area at the beginning of the CD. Volatile memory 16 may be provided by any conventional semiconductor random access memory.

A database of textual information about CDs that have been played or stored in enclosure 10 is maintained in non-volatile memory 18, as illustrated in FIG. 4, with a typical record layout in FIG. 5. In addition, non-volatile memory 18 may store the program for controller 12 and other information. Non-volatile memory 18 may be provided by electrically erasable programmable read-only memory (EEPROM) or semiconductor random access memory with a battery backup, or magnetic storage, such as a small hard drive, or any other conventional non-volatile memory.

Display 20 may be any conventional display capable of displaying a sufficient amount of textual information to enable a user to read the title of the recording and, preferably, the tracks or segments of the recording also. For example, a liquid crystal display (LCD) having sufficient segments to display twenty to eighty letters on one or more lines mounted at the surface of enclosure 10 would be adequate. However, display 20 may be able to display many more characters and possibly graphics also, or a smaller number of characters could be used in a scrolling display.

According to the present invention, communication device 22 may be provided by many different types of devices. To minimize cost, communication device 22 is preferably not a conventional analog modulator/demodulator (modem) or an ISDN terminal adapter. The device that can be most widely used is a dual-tone multi-frequency (DTMF) generator and detector, such as a Xecom DTMF transceiver, or a similar product from Mitel, coupled to a conventional RJ11 jack. This embodiment permits the apparatus to be connected to any phone line, e.g., the public switched telephone network (PSTN) 28. The remote database 13 will need a front-end processor that can communicate using DTMF signaling, but that can be provided by a general purpose computer connected to a plurality of DTMF transceivers for handling multiple calls.

A second embodiment of communication device 22 uses an industry standard interface, such as one of the standards set by the Electronic Industry Association and the Institute of Electrical and Electronics Engineers, e.g., EIA's RS-232 or IEEE 1394. Other alternatives include other kinds of jacks, such as coaxial and optical, and other interface specifications, such as Ethernet and proprietary interfaces. Even though modems are relatively inexpensive today compared to five to ten years ago some of, the types of interfaces suggested for use in the second embodiment can be implemented at a small fraction of the cost of a modem.

In the second embodiment, communication with the remote database 13 may use any conventional protocol, such as TCP/IP on the Internet. The industry standard (or proprietary) interface of the second embodiment is used to connect the apparatus to a device that has a connection to the Internet and accepts data from another device, but is not required to perform any functions regarding matching the information read from the recording with a database of textual information, since those functions are performed by the apparatus and at the remote database 13. For example, existing devices used to provide Internet connections via cable or satellite could be used with little or no modification, since all that is necessary is to transfer the data to and from the apparatus. Similarly, a general purpose computer could be programmed to treat the apparatus as a terminal that is to communicate with the Internet via any conventional connection to the Internet that the computer may have (dial up, local area network, dedicated line, etc.). The external device used in the second embodiment and its connections to remote database 13 takes the place of the PSTN 28 in FIG. 1.

In a third embodiment, communication device 22 may be directly connected to a local area network (LAN) that has a conventional connection to the Internet, or some other connection to the remote database 13. For example, the remote database 13 may be stored on a computer directly connected to the local area network, or via a wide area or other private network, as opposed to the public computer network commonly referred to as the Internet. In this case, either communication device 22, or controller 14 includes programming to implement a conventional protocol, such as a TCP/IP stack, for communication over a public computer network, e.g., the Internet, or the local/wide area network. As in the case of the second embodiment, PSTN 28 in FIG. 1 would be replaced with the public or private network.

The operation of the present invention will now be described with reference to FIGS. 2–5. When recording transport 12 first accesses a recording, the TOC is read in a conventional manner. An example of the contents of the TOC is illustrated in FIG. 5. As described in U.S. Pat. No. 5,751,672, incorporated herein by reference, the TOC information is sufficient to identify most CDs. However, contrary to the statements in the '672 patent, practical experience has found that rather than attempting to determine a "unique fingerprint" that works for all CDs, it is best to use fuzzy matching techniques, such as those disclosed in U.S. patent application Ser. Nos. 08/838,082 and 09/060,876, incorporated herein by reference. Controller 14 receives the information from the TOC and executes an algorithm to generate a disc ID for comparison with the disc IDs in the database stored in non-volatile memory 18.

At the present time, a large database of CD and track titles is available via the Internet from CDDB. Using this database as an example, controller 14 generates the disc ID by calculating the offset from the beginning of the CD to the beginning of second through the last track in frames (each CD has 75 frames per second). A typical disc ID is composed of four bytes, to calculate the first byte of the disc ID, the offsets are converted to seconds and the offset to the beginning of the first track is incremented by two seconds, representing a lead-in time. The digits of the offsets (plus lead-in time for the first track) in seconds are summed for the first byte. The second and third bytes of the disc ID are the entire running time in seconds which is the sum of the offset to the last track plus the playing time of the last track. The last byte of the disc ID is the number of tracks on the CD.

For example, a CD with six tracks having the following track times in minutes and seconds: 20:38, 3:34, 3:20, 3:52, 3:35, and 3:59; or in seconds: 1238, 214, 200, 232, 215, and 239 has a total track time as follows:

1238+214+200+232+215+239=2338 (or 0922 hex), 1238 1452 1652 1884 2099 2338 (running sum)

To calculate the first byte, the lead-in time of 2 seconds is added to the running time of the first track and the sum of the digits is calculated as follows:

1240→1+2+4=7 (running sum: 9)
1454→1+4+5+4=14 (running sum: 23)
1654→1+6+5+4=16 (running sum: 39)
1886→1+8+8+6=23 (running sum: 62)
2101→2+1+0+1=4 (running sum: 66, or 42 hex)

Thus, the disc ID is 42092206.

If there is a match for the disc ID in the local database stored in nonvolatile memory 18, the textual information about the CD is displayed on display 20. If the disc ID is not found in the local database, a query is formulated for the remote database 13. Because CDDB accepts information from users of the system, a verification of the disc ID calculation may be used when querying the CDDB database. The preferred CDDB query format is:

CDDB QUERY <discid><num tracks><offset_1>. . . <offset_n><total secs>with the offsets in frames and the total number of seconds (total secs) including the lead-in time. Thus, the preferred CDDB query for the above example is:

CDDB QUERY 42092206 6 183 93015 109098 124058 141515 157608 2340.

The query is sent to the remote database 13 by communication device 22. In the first embodiment communication device 22 is connected to the public switched telephone network (PSTN) 28 and its telephony components described above take the phone line off-hook and dial one or more stored numbers for a computer on which the remote database 13 is maintained. The query is then transmitted to a front end processor (not shown separately) for remote database 13.

Conventional DTMF signals provide 16 unique tones representing, 0–9, *, # and A–D (which are defined, even though they are not available on most phones) that can be transmitted at the rate of 20 tones per second. Thus, the front-end processor for the remote database 13 can formulate the query from hexadecimal codes transmitted from communication device 22. In the second and third embodiments, a conventional query may be sent to the external device connected to the Internet which takes the place of PSTN 28, as described above.

Once communication with the remote database 13 is established, the query 30 described above is sent and one of three responses is received from the remote database 13: (1) there is a single match; (2) there are multiple matches; or (3) no match is found. In case (1), the user is prompted to confirm that the correct CD was found and if so, the textual information received from the remote database 13 is stored in non-volatile memory 18 and sent to display 20. In case (2), the user is prompted to select one of the CD titles or indicate that none is correct. If one is selected, the textual information for the selected CD is stored in non-volatile memory 18 and sent to display 20. In case (3), or if the correct title is not provided in case (1) or (2), the user may given the option of playing without textual information, or inputting the title using one of the conventional techniques.

Preferably, the local database in non-volatile storage 18 maintains a record of all CDs that have ever been stored in the CD changer, until memory capacity has been reached. Therefore, the last field in the record layout illustrated in FIG. 4 may have a value indicating that the CD is not presently stored in the CD changer. Thus, when a CD is removed from the CD changer and then replaced, controller 14 will find a match for the disc ID of the CD in the local database in non-volatile memory 18 and will update the system location in the matching record with the new location of the CD.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

REFERENCE NUMBER LIST

10 enclosure
12 recording transport
13 remote database
14 controller 16 volatile memory
18 non-volatile memory
20 display
22 communication device (DTMF generator & detector)
24 infrared remote sensor
26 keyboard
28 public switched telephone network (PSTN)

What is claimed is:

1. An apparatus for playback of recordings and communication with a remote database to obtain information about the recordings, comprising:

a recorded signal output device to reproduce a recorded signal from a recording;

a display to display at least textual data;

a memory to store a textual recording name of the recording for output to said display in response to output of the recorded signal by said recorded signal output device;

a communication device to generate and detect dual-tone multifrequency signals to communicate with the remote database; and a controller, coupled to said recorded signal output device, said display, said memory and said communication device, to control said apparatus to establish communication with the remote database, query the remote database based on information in the recorded signal reproduced from the recording and supply the textual recording name of the recording from the remote database to said memory.

2. An apparatus for playback of recordings and communication with a remote database to obtain information about the recordings, comprising:

an enclosure;

a recorded signal output device, disposed in said enclosure, to reproduce a recorded signal from a recording;

a controller, disposed in said enclosure and coupled to said recorded signal output device, to control said apparatus;

a display, mounted at a first surface of said enclosure and coupled to said controller, to display at least textual data;

a memory, disposed in said enclosure and coupled to said controller, to store a textual recording name of the recording for output to said display in response to output of the recorded signal by said recorded signal output device; and a communication device, disposed in said enclosure and coupled to said controller, to obtain the textual recording name by establishing communication with the remote database without using a modem or an ISDN terminal adapter, querying the remote database based on information in the recorded signal reproduced from the recording and supplying the textual recording name of the recording from the remote database to said memory.

3. An apparatus as recited in claim 2, wherein said communication device generates and detects dual-tone multifrequency signals to communicate with the remote database.

4. An apparatus as recited in claim 2, further comprising an interface, coupled to said communication device and mounted at a second surface of said enclosure, for external communication using a standard set by one of the Electronic Industry Association and the Institute of Electrical and Electronics Engineers.

5. An apparatus as recited in claim 2, wherein the remote database is connected to a public computer network and said apparatus is connected to a local network coupled to the public computer network, wherein said apparatus further comprises a network interface, coupled to said communication device and mounted at a second surface of said enclosure, for external communication with the local network, and wherein at least one of said controller and said communication device provide a TCP/IP stack for communication with the remote database via said network interface and the local and public computer networks.

6. An apparatus as recited in claim 1, wherein the recording is stored on a storage medium in said apparatus during playback of the recording.

7. An apparatus as recited in claim 2, wherein the recording is stored on a storage medium in said apparatus during playback of the recording.

\* \* \* \* \*